United States Patent
Soliman et al.

(10) Patent No.: US 9,094,892 B2
(45) Date of Patent: Jul. 28, 2015

(54) WIRELESS WIDE AREA NETWORK TECHNOLOGY AGGREGATION AND BROADCAST

(75) Inventors: Samir Soliman, San Diego, CA (US); Soumya Das, San Diego, CA (US); Dilip Krishnaswamy, San Diego, CA (US); Robert Daley, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1248 days.

(21) Appl. No.: 12/577,541

(22) Filed: Oct. 12, 2009

(65) Prior Publication Data
US 2011/0085524 A1    Apr. 14, 2011

(51) Int. Cl.
*H04W 48/10* (2009.01)
*H04W 88/06* (2009.01)
*H04W 88/10* (2009.01)

(52) U.S. Cl.
CPC .............. *H04W 48/10* (2013.01); *H04W 88/06* (2013.01); *H04W 88/10* (2013.01)

(58) Field of Classification Search
CPC ...... H04W 48/10; H04W 88/06; H04W 88/10
USPC ........................................................ 370/338
See application file for complete search history.

(56) References Cited

U.S. PATENT DOCUMENTS

| 6,748,246 B1* | 6/2004 | Khullar ......................... 455/574 |
| 7,224,977 B2* | 5/2007 | Cavalli et al. .............. 455/452.1 |
| 7,747,251 B1* | 6/2010 | Pippert et al. .............. 455/432.1 |
| 7,978,667 B2* | 7/2011 | Kalhan ......................... 370/338 |
| 2002/0132626 A1 | 9/2002 | Tsunehara et al. |
| 2003/0017842 A1* | 1/2003 | Moles et al. .................. 455/552 |
| 2004/0091026 A1 | 5/2004 | Nakayama |
| 2006/0092872 A1 | 5/2006 | Lee et al. |
| 2007/0104142 A1* | 5/2007 | Kim .............................. 370/331 |
| 2007/0123260 A1* | 5/2007 | Kim et al. ..................... 455/436 |
| 2007/0211675 A1 | 9/2007 | Jain et al. |
| 2008/0130597 A1* | 6/2008 | Kalhan ......................... 370/338 |
| 2008/0227483 A1* | 9/2008 | Kuhl et al. ................. 455/552.1 |
| 2008/0279168 A1* | 11/2008 | Kalhan et al. ................. 370/342 |
| 2009/0196180 A1* | 8/2009 | Bahl et al. ..................... 370/235 |

(Continued)

FOREIGN PATENT DOCUMENTS

| EP | 1942691 A1 | 7/2008 |
| JP | 10200502 A | 7/1998 |

(Continued)

OTHER PUBLICATIONS

International Search Report and Written Opinion—PCT/US2010/052184, International Search Authority—European Patent Office—Mar. 7, 2011.

(Continued)

*Primary Examiner* — Luat Phung
*Assistant Examiner* — Saad A Waqas
(74) *Attorney, Agent, or Firm* — Jeffrey D. Jacobs

(57) ABSTRACT

A method, an apparatus, and a computer program product are provided for wireless communication in which wireless signal information is received through at least one wireless wide-area-network technology. In addition, data related to the wireless signal information is aggregated. Furthermore, the data is provided to a wireless node through a wireless wide-area-network technology different from the at least one wireless wide-area-network technology.

20 Claims, 8 Drawing Sheets

(56) References Cited

U.S. PATENT DOCUMENTS

2009/0225689 A1* 9/2009 Yu .............................. 370/310.2
2009/0268674 A1* 10/2009 Liu et al. ....................... 370/329

FOREIGN PATENT DOCUMENTS

| | | |
|---|---|---|
| JP | 2002310692 | 10/2002 |
| JP | 2004153585 | 5/2004 |
| JP | 2006135991 A | 5/2006 |
| JP | 2007088940 A | 4/2007 |
| WO | 9949678 A1 | 9/1999 |
| WO | 2008127162 A1 | 10/2008 |

OTHER PUBLICATIONS

Taiwan Search Report—TW099134778—TIPO—Dec. 19, 2013.

* cited by examiner

WIRELESS WIDE AREA NETWORK TECHNOLOGY AGGREGATION AND BROADCAST

BACKGROUND

1. Field

The present disclosure relates generally to communications and, more particularly, to an aggregation of wireless wide area network (WWAN) technology and an associated broadcast.

2. Background

Wireless communication systems are widely deployed to provide various telecommunication services such as telephony, video, data, messaging, and broadcasts. Typical wireless communication systems may be multiple-access systems capable of supporting communication with multiple users by sharing available system resources (e.g., bandwidth, transmit power). Examples of such multiple-access systems include code division multiple access (CDMA) systems, time division multiple access (TDMA) systems, frequency division multiple access (FDMA) systems, orthogonal frequency division multiple access (OFDMA) systems, and single-carrier frequency divisional multiple access (SC-FDMA) systems. The systems can conform to specifications of the Third Generation Partnership Project (3GPP), such as, for example, 3GPP Long Term Evolution (LTE). LTE is a set of enhancements to the Universal Mobile Telecommunications System (UMTS) mobile standard in order to improve spectral efficiency, lower costs, improve services, make use of new spectrum, and better integrate with other open standards.

Generally, wireless multiple-access communication systems may simultaneously support communication for multiple user equipment (UE). Each UE may communicate with a base station (BS) via transmissions on forward and reverse links. The forward link (or downlink (DL)) refers to the communication link from the BSs to UEs, and the reverse link (or uplink (UL)) refers to the communication link from UEs to the BSs. Communications between UEs and BSs may be established via single-input single-output (SISO) systems, single-input multiple-output (SIMO) systems, multiple-input single-output (MISO) systems, multiple-input multiple-output (MIMO) systems. UEs can communicate with other UEs (and/or BSs with other BSs) in peer-to-peer wireless network configurations.

An increasing number of wireless protocols and WWAN technologies will coexist in the future. UEs are likely to have the ability to use one or more of the WWAN technologies for wireless access. However, scanning for the existence of the WWAN technologies expends much energy and is a significant overhead for the UEs. As such, a need exists for a system that provides WWAN technological information to the UEs so that the UEs expend less energy and have reduced overhead.

SUMMARY

In an aspect of the disclosure, a method, an apparatus, and a computer program product for wireless communication are provided in which wireless signal information is received using at least one wireless wide-area-network technology. Data related to the wireless signal information is aggregated. A subset of the data is provided to a first wireless node using a wireless wide-area-network technology different from said at least one wireless wide-area-network technology.

In another aspect of the disclosure, a method, an apparatus, and a computer program product for wireless communication are provided in which data related to at least one wireless wide-area-network technology is received from at least one wireless node. A subset of the data is provided to a wireless node using a wireless wide-area-network technology different from the at least one wireless wide-area-network technology.

In another aspect of the disclosure, a method, an apparatus, and a computer program product for wireless communication are provided in which information, from a first apparatus, is received on at least one wireless wide-area-network technology using a wireless wide-area-network technology different from the at least one wireless wide-area-network technology. One of the at least one wireless wide-area-network technology is utilized through a second apparatus based on the received information.

DETAILED DESCRIPTION

Figure 1:
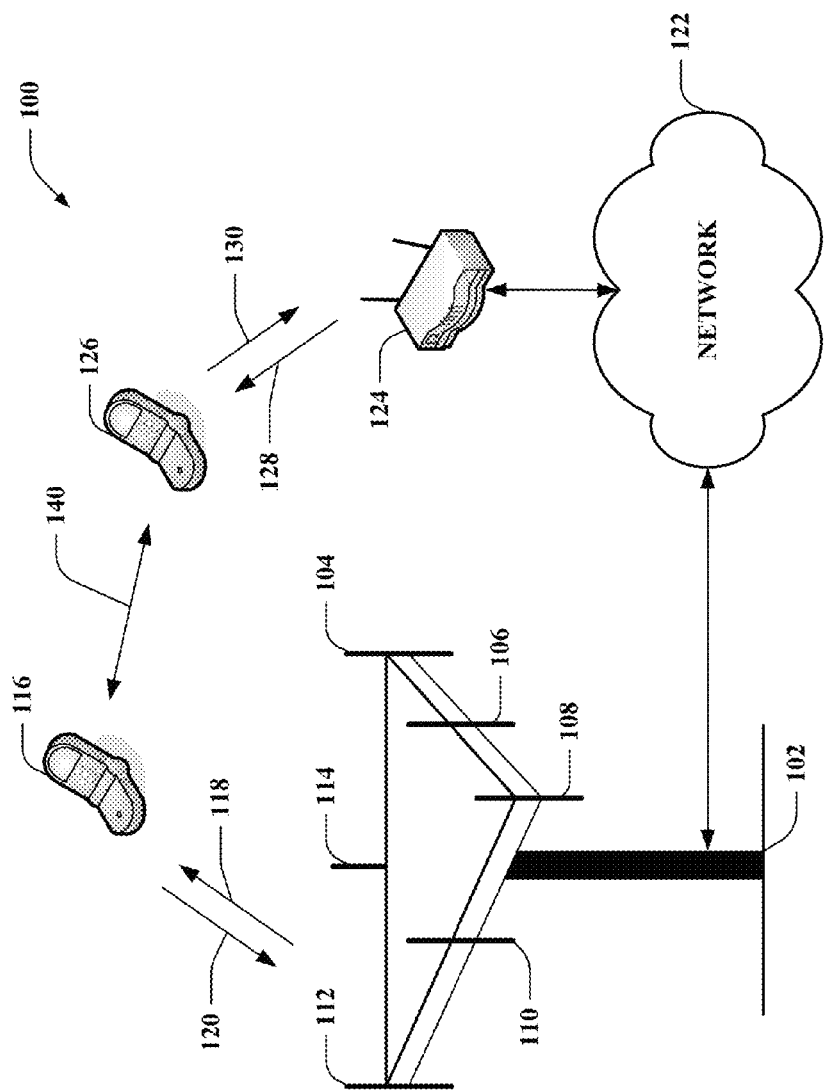
FIG. 1 is an illustration of a wireless communication system.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," and "system" are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a UE. A UE can also be called a mobile device, system, subscriber unit, subscriber station, mobile station, mobile, remote station, remote terminal, access terminal, user terminal, terminal, wireless communication device, user agent, user device, or device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A BS can be utilized for communicating with UEs and can also be referred to as an access point, Node B, evolved Node B (eNode B or eNB), base transceiver station (BTS), or some other terminology.

Moreover, various aspects or features described herein can be implemented as a method, apparatus, or article of manufacture using standard programming and/or engineering techniques. The term "article of manufacture" as used herein is intended to encompass a computer program accessible from any machine-readable device, carrier, or media. Machine-readable media can include but are not limited to magnetic storage devices (e.g., hard disk, floppy disk, magnetic strips), optical disks (e.g., compact disk (CD), digital versatile disk (DVD)), smart cards, flash memory devices (e.g., EPROM, card, stick, key drive), random access memory (RAM), a read only memory (ROM), a programmable ROM (PROM), an erasable PROM (EPROM), registers, a removable disk, a carrier wave, a transmission line, any other suitable storage device, or any other apparatus or means through which the instructions may be transmitted.

The techniques described herein may be used for various wireless communication systems such as CDMA, TDMA, FDMA, OFDMA, and SC-FDMA. The terms "system" and "network" are often used interchangeably. A CDMA system may implement a radio technology such as Universal Terrestrial Radio Access (UTRA) or CDMA2000. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). General packet radio service (GPRS) is a packet oriented mobile service for GSM users. An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, or Flash-OFDM. UTRA and E-UTRA are part of Universal Mobile Telecommunication System (UMTS). 3GPP LTE is a release that uses E-UTRA, which employs OFDMA on the downlink, SC-FDMA on the uplink, and multiple-input multiple-output (MIMO) antenna technology to support more users and higher data rates. UTRA, E-UTRA, UMTS, LTE, and GSM are described in documents from the 3GPP organization. CDMA2000 and UMB are described in documents from the 3rd Generation Partnership Project 2 (3GPP2) organization.

Referring now to FIG. 1, a wireless communication system 100 is illustrated. The system 100 includes a BS 102 that can include multiple antenna groups. For example, one antenna group can include antennas 104 and 106, another group can include antennas 108 and 110, and an additional group can include antennas 112 and 114. Two antennas are illustrated for each antenna group. However, more or fewer antennas can be utilized for each group. The BS 102 can additionally include a transmitter chain and a receiver chain, each of which can in turn include a plurality of components associated with signal transmission and reception (e.g., processors, modulators, multiplexers, demodulators, demultiplexers, antennas), as will be appreciated by one skilled in the art.

The BS 102 can communicate with one or more UEs such as the UE 116 and the UE 126. However, it is to be appreciated that the BS 102 can communicate with substantially any number of UEs similar to the UEs 116 and 126. As depicted, the UE 116 is in communication with the antennas 112 and 114. The antennas 112 and 114 transmit information to the UE 116 over a forward link 118 and receive information from the UE 116 over a reverse link 120. In a frequency division duplex (FDD) system, the forward link 118 can utilize a different frequency band than that used by the reverse link 120, for example. Further, in a time division duplex (TDD) system, the forward link 118 and the reverse link 120 can utilize a common frequency.

Each group of antennas and/or the area in which they are designated to communicate can be referred to as a sector of the BS 102. For example, antenna groups can be designed to communicate to UEs in a sector of the areas covered by the BS 102. In communication over the forward link 118, the transmitting antennas of the BS 102 can utilize beamforming to improve the signal-to-noise ratio (SNR) of the forward link 118 for the UE 116. While the BS 102 utilizes beamforming to transmit to the UE 116 scattered randomly through an associated coverage, UEs in neighboring sectors can be subject to less interference as compared to a BS transmitting through a single antenna to all the UEs with which the BS is communicating. The UEs 116 and 126 can also communicate directly (140) with one another using a peer-to-peer or ad hoc technology.

As shown in FIG. 1, the BS 102 can communicate with a network 122, such as a service provider's network, over a backhaul link connection. A femtocell 124 can be provided to facilitate communication with the UE 126 over the forward link 128 and the reverse link 130 (similarly to the forward link 118 and the reverse link 120, as described supra). The femtocell 124 can provide access to one or more UEs 126 much like the BS 102, but on a smaller scale. The femtocell 124 can be configured in a residence, business, and/or other close range setting. The femtocell 124 can connect to the network 122 utilizing a backhaul link connection, which can be over a broadband Internet connection (e.g., T1/T3, digital subscriber line (DSL), cable).

Figure 2:
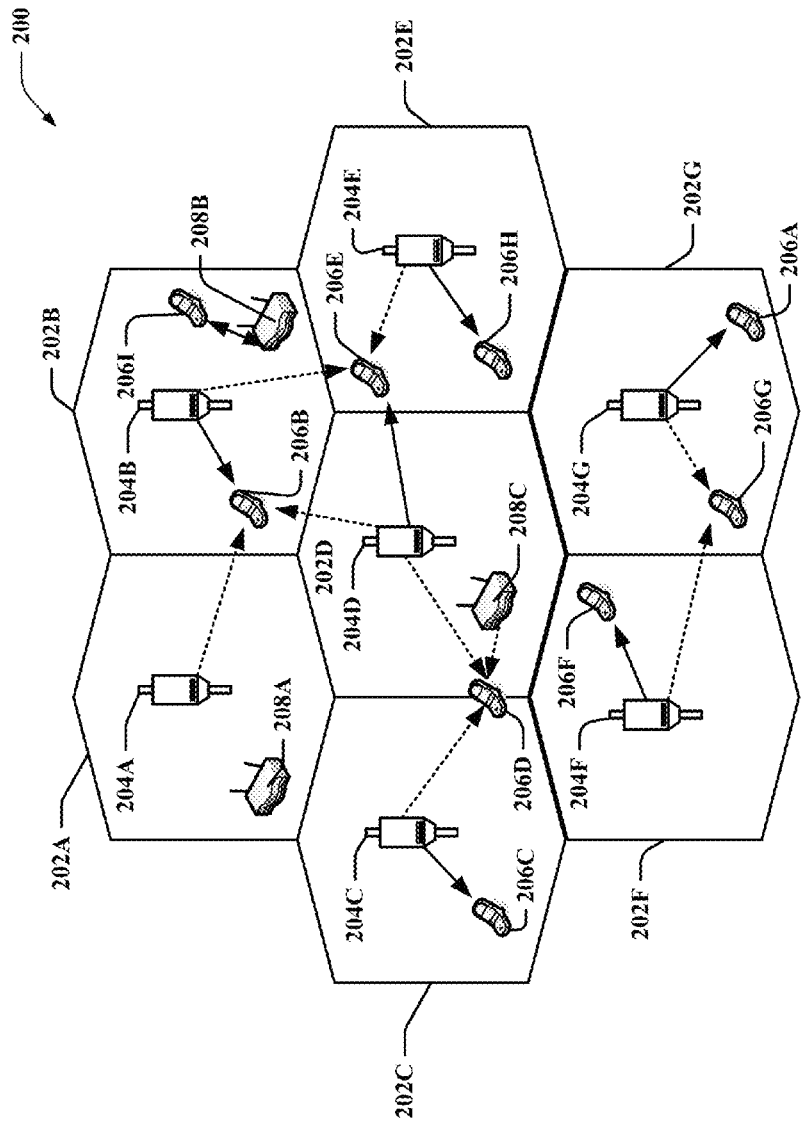
FIG. 2 is an illustration of a wireless communication network.

FIG. 2 is an illustration of a wireless communication network 200 configured to support a number of UEs. The system 200 provides communication for multiple cells, such as for example, macrocells 202A-202G, with each cell being serviced by corresponding BSs 204A-204G. The UEs 206A-206I are shown dispersed at various locations throughout the wireless communication system 200. Each UE 206A-206I can communicate with one or more BSs 204A-204G on a forward link and/or a reverse link, as described. In addition, the femtocells 208A-208C are shown. The UEs 206A-206I can additionally communicate with the femtocells 208A-208C. The wireless communication system 200 can provide service over a large geographic region, with the macrocells 202A-202G covering a broad area and the femtocells 208A-208C providing service in areas such as residences and office buildings. The UEs 206A-206I can establish connection with the BSs 204A-204G and/or the femtocells 208A-208C over the air and/or over a backhaul connection.

Figure 3:
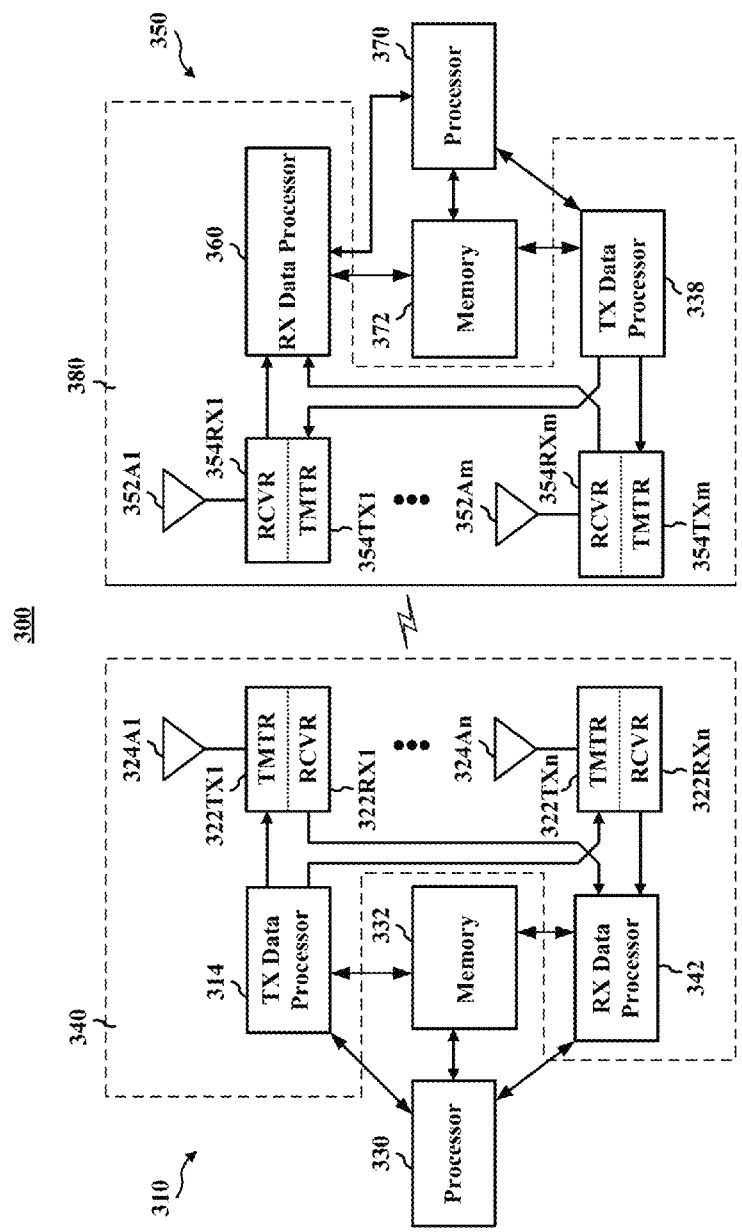
FIG. 3 is a block diagram of a wireless communication system.

FIG. 3 is a block diagram of a wireless communication system 300. The wireless communication system 300 depicts block diagrams for a BS 310 in communication with another UE 350. At the BS 310, the TX data processor 314 formats, codes, and interleaves data streams based on a particular coding scheme selected for each data stream. The TX data processor 314 can modulate the coded data for each data stream based on a particular modulation scheme (e.g., binary phase-shift keying (BPSK), quadrature phase-shift keying (QPSK), M-phase-shift keying (M-PSK), M-quadrature amplitude modulation (M-QAM)) selected for that data stream to provide modulation symbol streams. The data rate, coding, and modulation for each data stream can be determined by instructions performed or provided by the processor 330.

The BS 310 includes a set of modems 340. In one configuration, each modem may be represented as a TX data processor, a RX data processor, and one or more transceivers 322 and corresponding antennas 324A. In such a configuration, the TX and RX data processors 314, 342 may each include multiple TX and RX data processors, respectively, if the BS 310 includes two or more modems. In another configuration, one or more modems in the set of modems 340 have receive capabilities only and therefore may be represented as a RX data processor and one or more receivers 322Rx and corresponding antennas 324A.

The UE 350 includes a set of modems 380. Each modem may be represented as a TX data processor, a RX data processor, and one or more transceivers 354 and corresponding antennas 352A. As such, the TX and RX data processors 338, 360 may each include multiple TX and RX data processors, respectively, if the UE 350 includes two or more modems.

The RX data processor 360 demodulates, deinterleaves, and decodes the received data. The processing by RX data processor 360 is complementary to that performed by the TX data processor 314 at the BS 310.

At the UE 350, the TX data processor 338 formats, codes, and interleaves data streams based on a particular coding scheme selected for each data stream. The TX data processor 338 can modulate the coded data for each data stream based on a particular modulation scheme selected for that data stream to provide modulation symbol streams. The data rate, coding, and modulation for each data stream can be determined by instructions performed or provided by the processor 370. The data are conditioned by one or more of the transmitters 354TX and transmitted back to the BS 310.

At the BS 310, the modulated signals from the UE 350 are received by one or more of the antennas 324A, conditioned by the corresponding receivers 322RX, and demodulated and processed by a RX data processor 342 to extract the data transmitted by the UE 350.

The processors 330 and 370 can direct (e.g., control, coordinate, manage) operation at the BS 310 and the UE 350, respectively. The respective processors 330 and 370 can be associated with a machine-readable medium 332 and 372 that store program codes and data. The processors 330 and 370 can also perform computations to derive frequency and impulse response estimates for the uplink and downlink, respectively.

Figure 4:
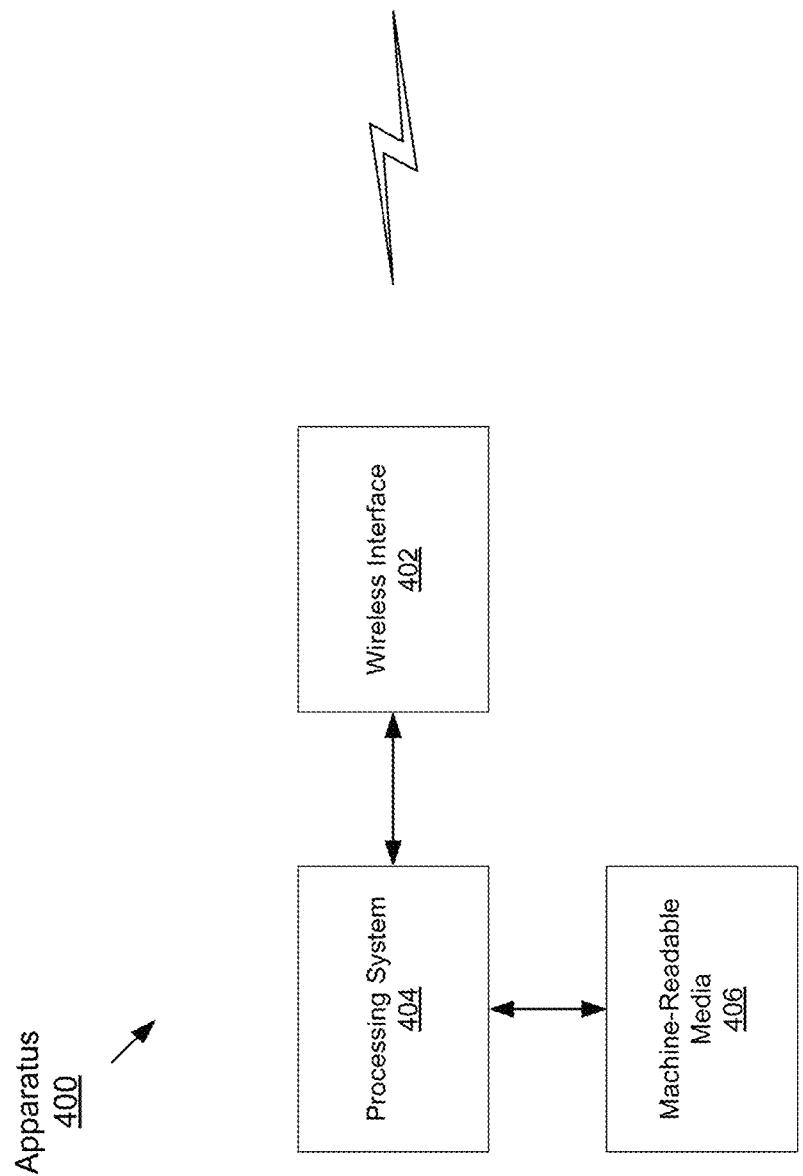
FIG. 4 is a block diagram illustrating a configuration for an apparatus.

FIG. 4 is a block diagram illustrating a configuration for an apparatus 400. The apparatus 400 may include a wireless interface 402, a processing system 404, and machine-readable media 406. The apparatus 400 may correspond to either the BS 310 or the UE 350. When the apparatus 400 corresponds to the BS 310, the processing system 404 corresponds to the processor 330; the machine-readable media 406 corresponds to the memory 332; and the wireless interface 402 corresponds to the set of modems 340, which includes the antennas 324A, the transceivers 322, the TX data processor 314, and the RX data processor 342. When the apparatus 400 corresponds to the UE 350, the processing system 404 corresponds to the processor 370; the machine-readable media 406 corresponds to the memory 372; and the wireless interface 402 corresponds to the set of modems 350, which includes the antennas 352A, the transceivers 354, the TX data processor 338, and the RX data processor 360.

The wireless interface 402 may be integrated into the processing system 404 or distributed across multiple entities in the apparatus. The processing system 404 may be implemented with one or more processors. The one or more processors may be implemented with any combination of general-purpose microprocessors, microcontrollers, digital signal processors (DSPs), digital signal processing devices (DSPDs), field programmable gate array (FPGAs), programmable logic devices (PLDs), controllers, integrated circuits (ICs), application specific ICs (ASICs), state machines, gated logic, discrete hardware components, or any other suitable entities that can perform calculations or other manipulations of information.

The processing system 404 is coupled to machine-readable media 406 for storing software. Alternatively, the processing system 404 may itself include the machine-readable media 406. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 404 to perform the various functions described below, as well as various protocol processing functions.

The wireless interface 402 may be configured to provide the complete physical layer implementation of the UE 116. The physical layer implementation will depend on the particular application and the overall design constraints imposed on the system. The processing system 404 is configured to implement all functionality above the physical layer and to use the transmitting and receiving functions of the wireless interface 402 to support communications with other wireless devices.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, and/or data can be passed, forwarded, or transmitted using any suitable means including memory sharing, message passing, token passing, and network transmission.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 5:
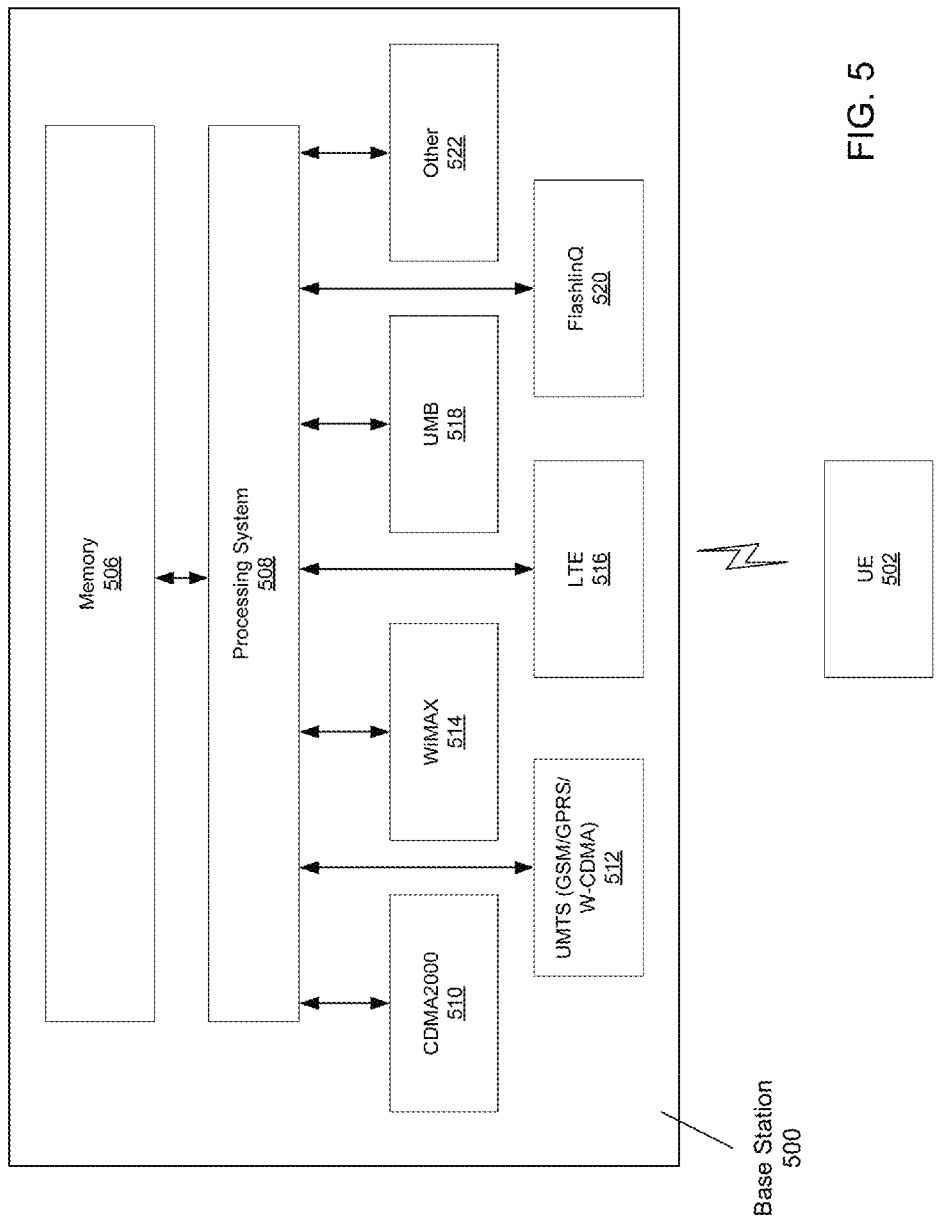
FIG. 5 is a block diagram of an exemplary BS and a UE in communication.

FIG. 5 is a block diagram of an exemplary BS 500 and a UE 502 in communication. In one configuration, the apparatus 400 is the BS 500. In another configuration, the apparatus 400 is the UE 502. The BS 500 includes a memory 506, a processing system 508, and a plurality of modems 510-522. The memory 506 corresponds to the machine-readable media 406, the plurality of modems 510-522 correspond to the wireless interface 402, and the processing system 508 corresponds to the processing system 404. The plurality of modems may include CDMA2000 510, UMTS (GSM/GPRS/W-CDMA) 512, WiMAX 514, LTE 516, UMB 518, FlashLinQ 520 (FlashLinQ is an air interface to enable direct mobile-to-mobile communication over a licensed spectrum), and/or other modems 522.

The processing system 508 is configured to interface with the modems 510-522 to determine whether technologies corresponding to the modems are available. The processing system 508 may be configured to provide service through one or more of the modems, while the other modems are utilized only to ascertain whether a particular technology is available. In such a configuration, the modems utilized only to ascertain whether a particular technology is available may not include a transmitter and transmitter related hardware.

The processing system 508 is configured to store the information in the memory 506. The processing system 508 may not be able to detect some technologies, such as when the BS has no corresponding modem or the BS is out of range of the access point providing service through the technology. In such case, the processing system 508 may be configured to receive information on available technologies from the UE 502 or other UEs and to store the received information in the memory 506. The processing system 508 is configured to inform the UE 502 of the aggregated technology information so that the UE 502 does not have to waste resources (time and energy) detecting whether a particular technology is available. The processing system 508 may determine which information to provide to the UE 502 depending on a location of the UE 502. The location of the UE 502 may be provided by the UE 502 itself, such as through GPS coordinates, or may be estimated by the processing system 508.

As discussed supra, the processing system 508, through the modems 510-522, scans the wireless spectrum to determine whether each of the particular WWAN technologies (corresponding to the modems 510-522) is available. The processing system 508 searches continuously for dynamically available wireless white space. The processing system 508 also detects spectrum to avoid for any detect-and-avoid (DAA) requirements, such as for UWB.

The processing system 508 is configured to transmit through one or more of the modems, through which the UE 502 is in communication, a k-tuple of information for each available WWAN protocol, the approximate amount of dynamically available white space spectrum available, and the capability of the BS 500 to provide DAA assist for specific wireless technologies. In one configuration, k is equal to two and the information includes a name of a protocol and a spectral occupancy range for the protocol. In another configuration, the information also includes additional information, such as a spectral load and a detected signal strength for the WWAN protocol. The processing system 508 may transmit the information in a beacon at a specified frequency or a specified set of frequencies.

The UE 502 may require additional information from the BS 500. The UE 502 may prune the WWAN protocol list to a subset of protocols that it can support. For the protocols that the UE 502 can support, the UE 502 may request a detected signal strength for each WWAN technology, a spectral load for each WWAN technology, frequency ranges for dynamically available white space, and DAA assist information for a specific wireless technology (e.g., UWB) for a specific frequency range (bands on which the UE 502 would like to transmit).

The processing system 508 is configured to provide the additional information as requested by the UE 502, and therefore to provide to the UE 502 WWAN technology signal strength (received SINR or CQI); WWAN technology spectral load (availability of OFDM sub-carriers); frequency ranges for the available white space; and DAA spectral ranges to avoid, or alternatively, spectral ranges that the UE 502 may consider using.

Once the UE 502 has the technology-related information from the BS 500, the UE 502 may utilize the information to determine whether to use a specific technology. In addition, the UE 502 may use the specified available white space for a short duration of time. Furthermore, the UE 502 may attempt DAA only on a subset of the spectrum not indicated as a spectral range to avoid or indicated as a spectral range to consider by the BS 500. The UE 502 can interleave DAA with transmissions/receptions in previously detected available spectrum.

As discussed supra, the processing system 508 may be configured to detect technologies itself and/or may be configured to rely on information provided by other UEs on available technologies. In the latter configuration, UEs such as UE 502 provide information to the BS 500 on technologies that they detect. The information includes WWAN protocol information, white space that the UE 502 is going to use and the duration of the usage, and incremental information on the spectral range to avoid (or which may be available) for DAA assist. The processing system 508 receives this information from the UEs and may average the information and determine which information is reliable and which information is unreliable. Information that is duplicated from multiple UEs may be deemed more reliable than information that is received from one UE only. The processing system 508 may then aggregate the information in memory 506 and provide the information and a corresponding reliability measure to UEs, such as UE 502, that request such information.

Figure 6:
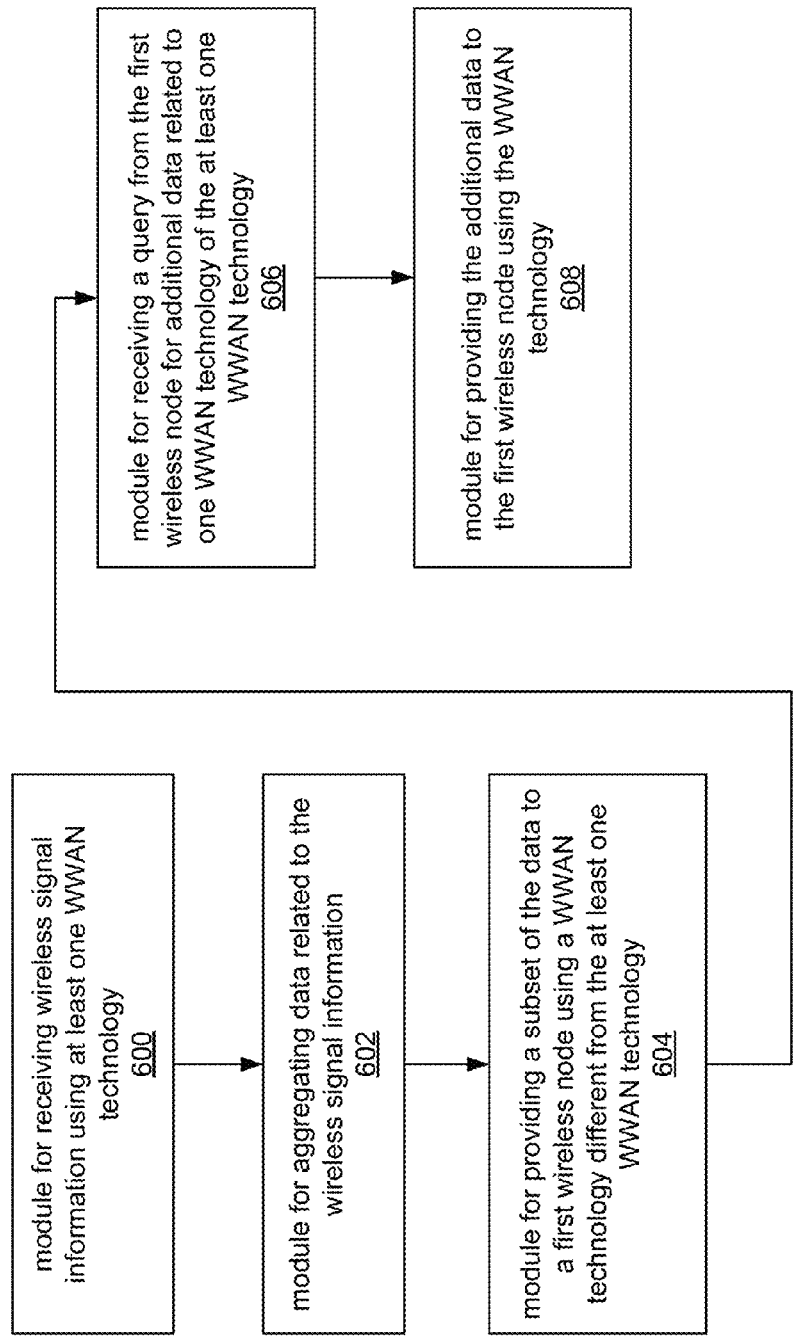
FIG. 6 is a module flow chart of an exemplary apparatus.

FIG. 6 is a module flow chart of an exemplary apparatus 400, which may be the BS 500. As discussed supra, a BS may receive wireless signal information using at least one wireless WWAN technology (600). For example, a BS may service other UEs using CDMA2000, but include other modems, such as a UMB modem and a WiMAX modem in order to receive wireless signal information using the UMB modem and WiMAX modem. The BS aggregates data related to the received wireless signal information (602). The BS provides a subset of the data (part or all of the data) to a UE using a WWAN technology (e.g., CDMA2000) different from the at least one wireless WWAN technology (604) (e.g., UMB, WiMAX). The BS may select which data to send to a UE based on a location of the UE. The BS may receive location information (e.g., GPS information) from the UE or the BS may estimate the location of the UE. The BS may receive a query from a UE for additional information related to one or more of the WWAN technologies for which the UE received the data (606). The BS may provide the additional data to the UE using the WWAN technology (608) (e.g., CDMA2000).

In one configuration, the exemplary apparatus 400 includes means for receiving wireless signal information using at least one wireless wide-area-network technology, means for aggregating data related to the wireless signal information, and means for providing a subset of the data to a first wireless node using a wireless wide-area-network technology different from said at least one wireless wide-area-network technology. The aforementioned means is the processing system 404 configured with the algorithm and modules identified in FIG. 6.

In one configuration, the exemplary apparatus 400 may additionally include means for receiving a query from the first wireless node for additional data related to one wireless wide-area-network technology of said at least one wireless widearea-network technology, and means for providing the additional data to the first wireless node using said wireless wide-area-network technology. In another configuration, the exemplary apparatus 400 may additionally include means for receiving additional data from a second wireless node, the additional data being related to a set of wireless wide-area-network technologies different from said at least one wireless wide-area-network technology, and means for providing a subset of the additional data to the first wireless node using said wireless wide-area-network technology, said wireless wide-area-network technology being different from the wireless wide-area-network technologies in the set. In another configuration, the exemplary apparatus 400 may additionally include means for providing a reliability measure, corresponding to the subset of the additional data, to the first wireless node using said wireless wide-area-network technology. In another configuration, the exemplary apparatus 400 may additionally include means for increasing the reliability measure when data are received from other wireless nodes that are similar to the additional data. In another configuration, the exemplary apparatus 400 may additionally include means for receiving location information from the first wireless node, wherein the subset of the data is dependent on the received location information. Each of the aforementioned means is the processing system 404 configured with the identified algorithm.

Figure 7:
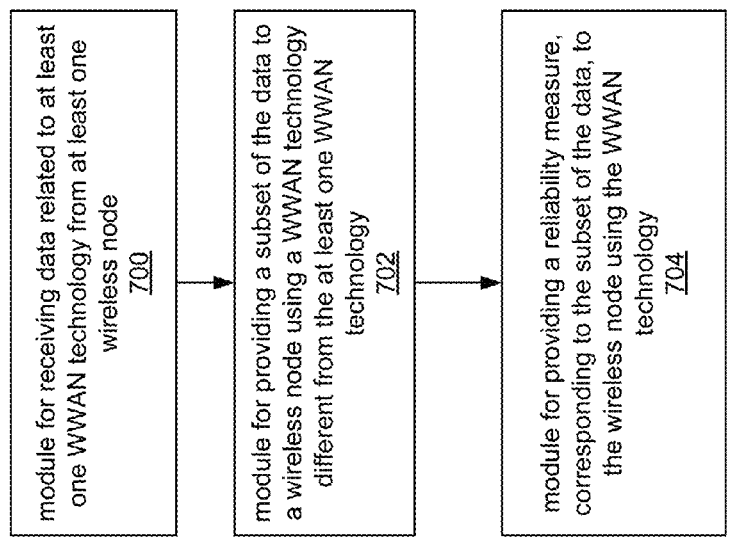
FIG. 7 is another module flow chart of an exemplary apparatus.

FIG. 7 is another module flow chart of an exemplary apparatus 400, which may be the BS 500. The BS may receive data related to WWAN technologies from other UEs (700). The BS may aggregate UE provided data with data aggregated from received wireless signal information. That is, the BS may combine data received through its own modems with data received from other UEs. The BS may provide a subset of the data to a UE using a WWAN technology different from the WWAN technologies to which the data is related. The BS may also provide a reliability measure to the UE along with the data. The reliability measure corresponds to the UE provided data and is increased by the BS when multiple UEs provide similar data.

In one configuration, the exemplary apparatus includes means for receiving data related to at least one wireless wide-area-network technology from at least one wireless node, and means for providing a subset of the data to a wireless node using a wireless wide-area-network technology different from the at least one wireless wide-area-network technology. The aforementioned means is the processing system 404 configured with the algorithm and modules identified in FIG. 7.

Figure 8:
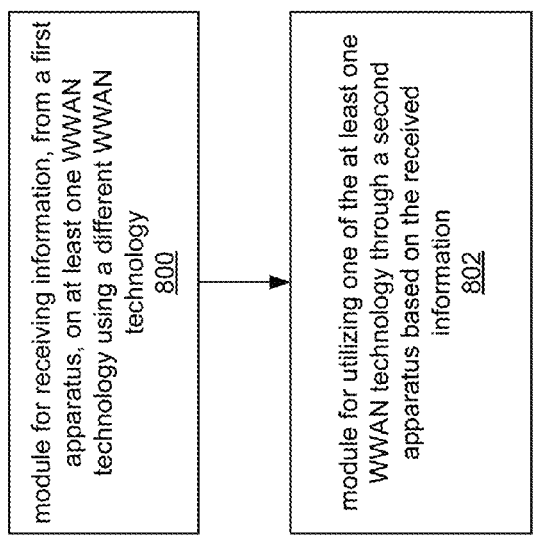
FIG. 8 is yet another module flow chart of an exemplary apparatus.

FIG. 8 is yet another module flow chart of an exemplary apparatus 400, which may be the UE 502. The UE receives the information from the BS on at least one WWAN technology (e.g., WiMAX, UMB) using a different WWAN technology (e.g., CDMA2000). The UE may then utilize one of the at least one WWAN technology (e.g., WiMAX or UMB) through a different BS based on the received information.

In one configuration, the exemplary apparatus includes means for receiving information, from a first apparatus, on at least one wireless wide-area-network technology using a wireless wide-area-network technology different from the at least one wireless wide-area-network technology, and means for utilizing one of the at least one wireless wide-area-network technology through a second apparatus based on the received information. The aforementioned means is the processing system 404 configured with the algorithm and modules identified in FIG. 8.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communication of a base station, comprising:
   receiving data related to a plurality of wireless wide-area-network (WWAN) technologies, wherein first data related to a first set of WWAN technologies is received through one or more corresponding WWAN technology modems of the base station, and second data related to a second set of WWAN technologies is received from a second wireless node using a WWAN technology not included in the first set of WWAN technologies, the second set of WWAN technologies being different from the first set of WWAN technologies;
   aggregating the first data and the second data to generate a list of available WWAN technologies and corresponding protocols;
   providing the list to a first wireless node using a WWAN technology different from the WWAN technologies included in the list;
   receiving a query from the first wireless node for additional data related to a select one of the WWAN technologies included in the list, wherein the additional data comprises frequency ranges of dynamically available white space within a frequency range of the select one of the WWAN technologies;
   providing the additional data to the first wireless node using a WWAN technology different from the WWAN technologies included in the list; and
   providing a reliability measure, corresponding to the additional data, to the first wireless node, and increasing the reliability measure when data are received from other wireless nodes that are similar to the additional data.

2. The method of claim 1, wherein the additional data comprises at least one of a spectral occupancy range for a protocol, a spectral load, a detected signal strength, or detect-and-avoid information for the select one of the WWAN technologies.

3. The method of claim 1, further comprising receiving location information from the first wireless node, wherein the additional data is dependent on the received location information.

4. A method for wireless communication of a wireless node, comprising:

receiving information, from a first apparatus, the information comprising a list of available WWAN technologies and corresponding protocols, the list received using a WWAN technology different from the WWAN technologies included in the list;

selecting one of the WWAN technologies included in the list;

querying the first apparatus for additional information on the selected WWAN technology, wherein the additional information comprises frequency ranges of dynamically available white space within a frequency range of the selected WWAN technology;

receiving the additional information from the first apparatus using a WWAN technology different from the WWAN technologies included in the list; and receiving a reliability measure from the first apparatus, corresponding to the additional information, wherein the reliability measure is increased by the first apparatus when data are received by the first apparatus from other wireless nodes that are similar to the additional information.

5. The method of claim 4, further comprising providing location information to the first apparatus, wherein the information received from the first apparatus is dependent on the provided location information.

6. An apparatus for wireless communication, comprising:
means for receiving data related to a plurality of wireless wide-area-network (WWAN) technologies, wherein first data related to a first set of WWAN technologies is received through one or more corresponding WWAN technology modems of the apparatus, and second data related to a second set of WWAN technologies is received from a second wireless node using a WWAN technology not included in the first set of WWAN technologies, the second set of WWAN technologies being different from the first set of WWAN technologies;
means for aggregating the first data and the second data to generate a list of available WWAN technologies and corresponding protocols;
means for providing the list to a first wireless node using a WWAN technology different from the WWAN technologies included in the list;
means for receiving a query from the first wireless node for additional data related to a select one of the WWAN technologies included in the list, wherein the additional data comprises frequency ranges of dynamically available white space within a frequency range of the select one of the WWAN technologies;
means for providing the additional data to the first wireless node using a WWAN technology different from the WWAN technologies included in the list; and
means for providing a reliability measure, corresponding to the additional data, to the first wireless node, and increasing the reliability measure when data are received from other wireless nodes that are similar to the additional data.

7. The apparatus of claim 6, wherein the additional data comprises at least one of a spectral occupancy range for a protocol, a spectral load, a detected signal strength, or detect-and-avoid information for the select one of the WWAN technologies.

8. The apparatus of claim 6, further comprising means for receiving location information from the first wireless node, wherein the additional data is dependent on the received location information.

9. An apparatus for wireless communication, comprising:
means for receiving information, from a first apparatus, the information comprising a list of available WWAN technologies and corresponding protocols, the list received using a WWAN technology different from the WWAN technologies included in the list;
selecting one of the WWAN technologies included in the list;
means for querying the first apparatus for additional information on the selected WWAN technology, wherein the additional information comprises frequency ranges of dynamically available white space within a frequency range of the selected WWAN technology;
means for receiving the additional information from the first apparatus using a WWAN technology different from the WWAN technologies included in the list; and
means for receiving a reliability measure from the first apparatus, corresponding to the additional information, wherein the reliability measure is increased by the first apparatus when data are received by the first apparatus from other wireless nodes that are similar to the additional information.

10. The apparatus of claim 9, further comprising means for providing location information to the first apparatus, wherein the information received from the first apparatus is dependent on the provided location information.

11. A computer program product for a base station, comprising:
a non-transitory computer-readable medium, comprising:
code for receiving data related to a plurality of wireless wide-area-network (WWAN) technologies, wherein first data related to a first set of WWAN technologies is received through one or more corresponding WWAN technology modems of the base station, and second data related to a second set of WWAN technologies is received from a second wireless node using a WWAN technology not included in the first set of WWAN technologies the second set of WWAN technologies being different from the first set of WWAN technologies;
code for aggregating the first data and the second data to generate a list of available WWAN technologies and corresponding protocols;
code for providing the list to a first wireless node using a WWAN technology different from the WWAN technologies included in the list;
code for receiving a query from the first wireless node for additional data related to a select one of the WWAN technologies included in the list, wherein the additional data comprises frequency ranges of dynamically available white space within a frequency range of the select one of the WWAN technologies;
code for providing the additional data to the first wireless node using a WWAN technology different from the WWAN technologies included in the list; and
code for providing a reliability measure, corresponding to the additional data, to the first wireless node, and for increasing the reliability measure when data are received from other wireless nodes that are similar to the additional data.

12. The computer program product of claim 11, wherein the additional data comprises at least one of a spectral occupancy range for a protocol, a spectral load, a detected signal strength, or detect-and-avoid information for the select one of the WWAN technologies.

13. The computer program product of claim 11, wherein the non-transitory computer-readable medium further comprises code for receiving location information from the first wireless node, wherein the additional data is dependent on the received location information.

14. A computer program product, comprising:
a non-transitory computer-readable medium, comprising:
code for receiving information, from a first apparatus, the information comprising a list of available WWAN technologies and corresponding protocols, the list received using a WWAN technology different from the WWAN technologies included in the list;
selecting one of the WWAN technologies included in the list;
code for querying the first apparatus for additional information on the selected WWAN technology, wherein the additional information comprises frequency ranges of dynamically available white space within a frequency range of the selected WWAN technology;
code for receiving the additional information from the first apparatus using a WWAN technology different from the WWAN technologies included in the list; and
code for receiving a reliability measure from the first apparatus, corresponding to the additional information, wherein the reliability measure is increased by the first apparatus when data are received by the first apparatus from other wireless nodes that are similar to the additional information.

15. The computer program product of claim 14, wherein the non-transitory computer-readable medium further comprises code for providing location information to the first apparatus, wherein the information received from the first apparatus is dependent on the provided location information.

16. An apparatus for wireless communication, comprising:
a wireless interface configured to use a plurality of wireless wide-area-network technologies;
a processing system coupled to the wireless interface and configured to:
receive data related to a plurality of wireless wide-area-network (WWAN) technologies, wherein first data related to a first set of WWAN technologies is received through one or more corresponding WWAN technology modems of the apparatus and second data related to a second set of WWAN technologies is received from a second wireless node using a WWAN technology not included in the first set of WWAN technologies, the second set of WWAN technologies being different from the first set of WWAN technologies;
aggregate the first data and the second data to generate a list of available WWAN technologies and corresponding protocols;
provide the list to a first wireless node using a WWAN technology different from the WWAN technologies included in the list;
receive a query from the first wireless node for additional data related to a select one of the WWAN technologies included in the list, wherein the additional data comprises frequency ranges of dynamically available white space within a frequency range of the select one of the WWAN technologies;
provide the additional data to the first wireless node using a WWAN technology different from the WWAN technologies included in the list; and
provide a reliability measure, corresponding to the additional data, to the first wireless node, and increase the reliability measure when data are received from other wireless nodes that are similar to the additional data.

17. The apparatus of claim 16, wherein the additional data comprises at least one of a spectral occupancy range for a protocol, a spectral load, a detected signal strength, or detect-and-avoid information for the select one of the WWAN technologies.

18. The apparatus of claim 16, wherein the processing system is further configured to receive location information from the first wireless node, wherein the additional data is dependent on the received location information.

19. An apparatus for wireless communications, comprising:
a wireless interface configured to use a plurality of wireless wide-area-network technologies;
a processing system coupled to the wireless interface and configured to:
receive, through the wireless interface, information, from a first apparatus, the information comprising a list of available WWAN technologies and corresponding protocols, the list received using a WWAN technology different from the WWAN technologies included in the list;
selecting one of the WWAN technologies included in the list;
query the first apparatus for additional information on the selected WWAN technology, wherein the additional information comprises frequency ranges of dynamically available white space within a frequency range of the selected WWAN technology;
receive the additional information from the first apparatus using a WWAN technology different from the WWAN technologies included in the list; and
receive a reliability measure from the first apparatus, corresponding to the additional information, wherein the reliability measure is increased by the first apparatus when data are received by the first apparatus from other wireless nodes that are similar to the additional information.

20. The apparatus of claim 19, wherein the processing system is further configured to provide location information to the first apparatus, wherein the information received from the first apparatus is dependent on the provided location information.

* * * * *